3,468,827
STABILIZATION
George R. Hill and Donald G. Needham, Bartlesville, Okla., assignors to Phillips Petroleum Company, a corporation of Delaware
No Drawing. Filed Nov. 15, 1965, Ser. No. 507,680
Int. Cl. C08f 45/62
U.S. Cl. 260—23       4 Claims

ABSTRACT OF THE DISCLOSURE

Ethylene/vinyl acetate copolymers are corrosion stabilized by incorporating in the copolymer an effective stabilizing amount of at least one metal salt of a fatty acid.

---

This invention relates to a method for corrosion stabilizing a polymer and the corrosion stabilized polymer itself.

Heretofore ethylene/vinyl acetate copolymers have been found to exhibit substantial corrosive characteristics as to the steel and other materials from which the process equipment which handles these copolymers is made. Many attempts have been made to reduce the corrosive nature of these copolymers but most failed to various extents for various reasons.

It has now been found that the corrosive nature of these copolymers is substantially obviated by the addition of at least one metal salt, i.e. soap, of a fatty acid wherein the metal is at least one of calcium, barium, strontium, cadmium, and zinc, preferably calcium, barium, and strontium, and the fatty acid moiety contains from 8 to 22, preferably 12 to 18, carbon atoms, inclusive.

Accordingly, this invention produces a corrosion stabilized ethylene/vinyl acetate copolymer containing a minor but effective amount of one or more of the above-identified metal salts of fatty acids.

It is an object of this invention to provide a new and improved method for corrosion stabilizing ethylene/vinyl acetate copolymers. It is another object to provide a corrosion stabilized ethylene/vinyl acetate copolymer.

Other aspects, objects, and the several advantages of this invention will be apparent to those skilled in the art from the description and appended claims.

According to this invention conventional ethylene/vinyl acetate copolymers well known in the art and available commercially are employed. Generally these copolymers contain a minor finite amount up to 30, preferably from about 0.5 to about 15, weight percent vinyl acetate based on the total weight of the copolymer.

One or mixtures of two or more metal salts of fatty acids mentioned above can be employed in the copolymer. The amount of such salt or salts employed can vary widely but will generally be from a minor amount effective to promote corrosion stabilization up to 3, preferably from about 0.1 to about 1.5, weight percent based upon the total weight of the copolymer. Suitable salts include calcium laurate, barium laurate, cadmium myristate, strontium palmitate, calcium stearate, barium stearate, cadium stearate, and the like.

The metal salt of the fatty salt can be incorporated in the copolymer in any conventional manner which includes melt blending as well as dry blending, e.g. tumbling the ingredients in pelleted or other particulate form. Suitable blending apparatus include roll mills, Banbury mixers, Brabender mixers, compounding extruders, and the like. The time for mixing can vary widely but will generally be from a few, e.g. 3, to 60 minutes. The temperature of blending can also vary widely depending upon the blending technique and can vary from ambient temperatures in the case of dry blending to as high as 400° F. for melt blending. The blending pressure can be ambient as well as sub- or super-atmospheric and the atmosphere can be either ambient or inert.

Other conventional additives such as polyethylene stabilizers, e.g. "Ionol," pigments, and the like can be employed in the copolymers of this invention. The copolymers of this invention can be used in any conventional processing apparatus and will substantially reduce and in some cases substantially eliminate corrosion of that apparatus heretofore caused by the ethylene/vinyl acetate copolymer.

EXAMPLE

A commercial copolymer of ethylene/vinyl acetate containing 9 weight percent vinyl acetate based on the total weight of the copolymer was tested as to its corrosive activity with a mild steel using varying amounts of different stabilizers of this invention. The various stabilizers of this invention were incorporated in the copolymer utilizing a two-roll mill on which each separate sample of polymer and stabilizer was mixed for about 10 minutes at a temperature of from 250 to 300° F. Different samples of the polymer containing different amounts of the stabilizer of this invention were placed in contact with the steel sample and held in a press employing a 12-inch square plate under a 20 ton pressure for 16 hours at 400° F. Thereafter the steel sample was removed from the press and the polymer and the surface of the sample which was in contact with the polymer was visually observed for corrosion.

The results of the tests were as follows:

| Stabilizer | Weight percent stabilizer based on total weight of copolymer | Corrosion results |
| --- | --- | --- |
| Calcium stearate | 0.5 | Surface of the steel sample remained shiny indicating no corrosion. |
| Do | 0.25 | |
| Barium stearate | 1 | |
| Do | 0.5 | |
| Do | 0.25 | |
| Control (copolymer with no corrosion stabilizer added). | | Surface of the steel sample was pitted and badly discolored indicating severe corrosion. |

Two known stabilizers for other polymers were also tested in the same manner as set forth above but with negative results as to reducing of the corrosivity of the copolymer. These results are as follows:

| Stabilizer | Weight percent stabilizer based on total weight of copolymer | Corrosion results |
| --- | --- | --- |
| 100% epoxy resin, specific gravity 1.17.[1] | 1 | Surface of steel sample was discolored indicating corrosion. |
| 100% epoxy resin, specific gravity 1.17.[1] | 0.2 | |
| Tin mercaptide [2] | 1 | Surface of steel sample was discolored and pitted. |

[1] Epoxy 909: Epoxy 909 is the designation given this material by the supplier, Ferro Corporation, Cleveland, Ohio.
[2] "Advastab," TM 918, "Advastab" is a trademark of the Advance Solvents and Chemical Division of Carlisle Chemical Works.

These results show that the stabilizers of this invention substantially obviate the corrosivity of ethylene/vinyl acetate and that other known stabilizers do not have the same effect.

Reasonable variations and modifications are possible within the scope of this disclosure without departing from the spirit and scope thereof.

We claim:
1. A corrosion stabilized ethylene/vinyl acetate copolymer comprising said copolymer containing an effective stabilizing amount of at least one metal salt of a fatty acid wherein the metal is at least one of calcium, barium, strontium, zinc, and cadmium and the fatty acid moiety contains from 8 to 22 carbon atoms, inclusive.

2. The copolymer according to claim 1 wherein the salt is at least one of calcium stearate, calcium palmitate, calcium laurate, barium stearate, barium palmitate and barium laurate, and the salt is present in the amount of from an effective stabilizing amount up to about 3 weight percent based on the total weight of the copolymer.

3. The copolymer according to claim 2 wherein the salt is calcium stearate.

4. The copolymer according to claim 2 wherein the salt is barium stearate.

References Cited
UNITED STATES PATENTS

| | | | |
|---|---|---|---|
| 3,265,649 | 8/1966 | Faltings | 260—23 |
| 3,254,041 | 5/1966 | De Pierri | 260—23 |

DONALD E. CZAJA, Primary Examiner

B. J. BARRACK, Assistant Examiner